United States Patent [19]

Fukuhara

[11] Patent Number: 4,861,467
[45] Date of Patent: Aug. 29, 1989

[54] SYSTEM FOR REMOVING CONTAMINANTS FROM AN OIL TANK IN A HYDRAULIC DEVICE

[75] Inventor: Hiroshi Fukuhara, Yokohama, Japan

[73] Assignee: Fukuhara Seisaku Co., Ltd., Japan

[21] Appl. No.: 207,900

[22] Filed: Jun. 7, 1988

Related U.S. Application Data

[63] Continuation of Ser. No. 20,995, Mar. 2, 1987, abandoned.

[30] Foreign Application Priority Data

Nov. 7, 1986 [JP] Japan .......................... 61-171831[U]

[51] Int. Cl.$^4$ ............................................. B01D 21/00
[52] U.S. Cl. ................................... 210/168; 184/6.13; 184/6.24; 210/171; 210/172; 210/194; 210/416.5
[58] Field of Search ............ 210/DIG. 13, 313, 416.4, 210/434, 194, 168, 171, 172, 232, 416.5, 418; 123/196 A; 184/6.13, 6.21, 6.24

[56] References Cited

U.S. PATENT DOCUMENTS

| | | | |
|---|---|---|---|
| 2,946,445 | 7/1960 | Tursky | 210/232 |
| 3,297,160 | 1/1967 | Humbert, Jr. | 210/232 |
| 3,707,202 | 12/1972 | Dixon | 123/196 A |
| 3,773,144 | 11/1973 | Hummel | 184/6.24 |
| 4,139,464 | 2/1979 | Coward | 210/168 |
| 4,151,823 | 5/1979 | Grosse et al. | 123/196 A |
| 4,361,488 | 11/1982 | White et al. | 210/168 |
| 4,648,363 | 3/1987 | Kronich | 123/196 A |
| 4,797,205 | 1/1989 | Kitamura | 210/171 |

*Primary Examiner*—Frank Spear
*Assistant Examiner*—Joseph Drodge
*Attorney, Agent, or Firm*—Cushman, Darby & Cushman

[57] ABSTRACT

An oil filter device for an oil tank of a hydraulic device in which a drain opening of the oil tank is connected to the inflow passage of the oil filter device by an oil inflow pipe. An oil suction pipe of an oil pressure pump of an oil circulation system in the hydraulic device is connected to the outflow passage of the oil filter device by an oil return pipe. Further, a flow rate throttle is disposed in a preferred position of the oil return pipe.

1 Claim, 1 Drawing Sheet

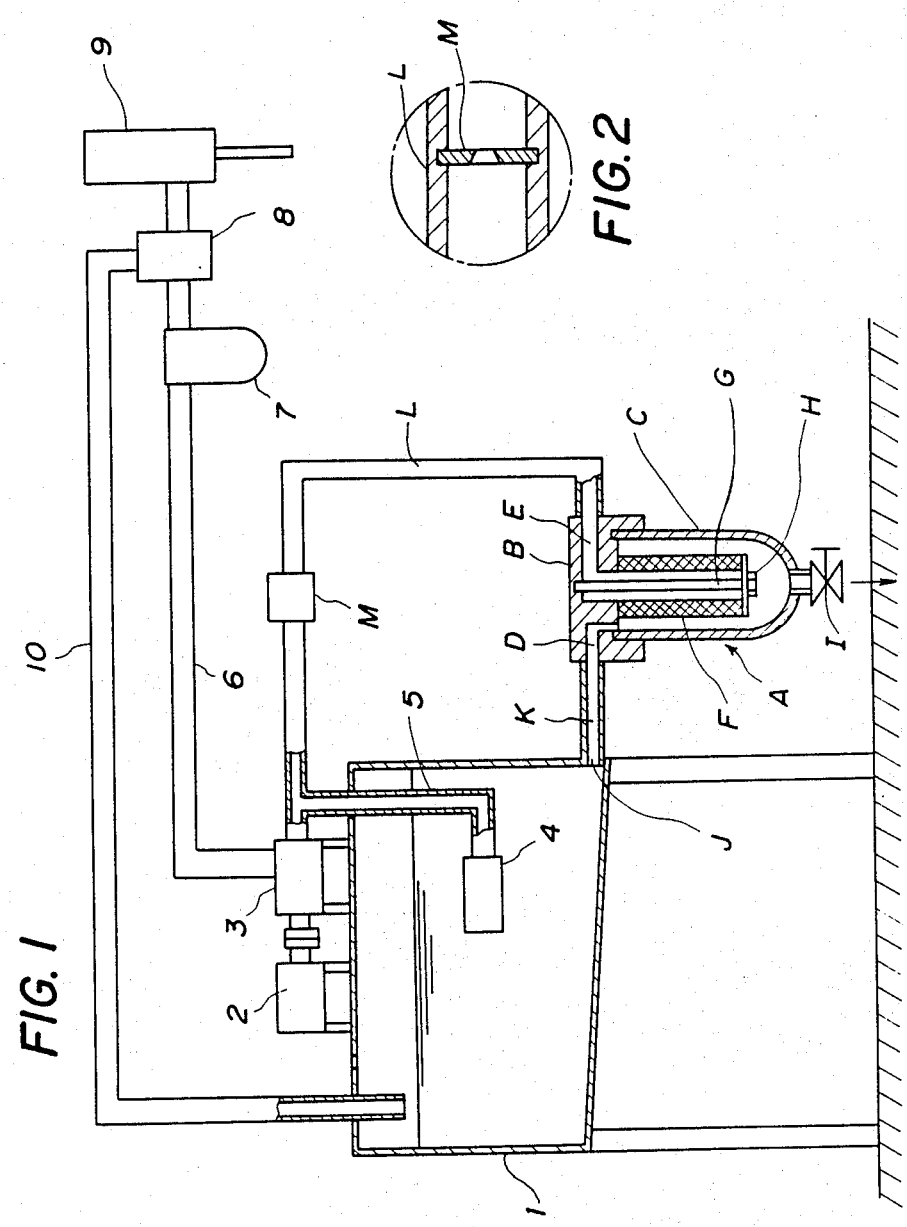

bottom of the oil tank.
SYSTEM FOR REMOVING CONTAMINANTS FROM AN OIL TANK IN A HYDRAULIC DEVICE This is a continuation of Ser. No. 020,995, filed 3/2/87 now abandoned.

BACKGROUND OF THE INVENTION

1. Field of the Invention

This invention relates to oil filter means for an oil tank of hydraulic means, and more particularly means for removing the dusts, iron rust and water which remain on the bottom of the oil tank.

2. Description of the Prior Art

A hydraulic device which comprises an oil tank, a hydraulic pump and a hydraulic cylinder is used in various industrial fields. In an oil circulating passage of the oil pressure device foreign matters such as the dusts, iron rust, a water in the oil or the are deposited. More specifically, certain foreign matters are deposited in the hydraulic cylinder, and the iron rust, dusts and condensed water are deposited in the oil tank as well as in its piping.

If those foreign matters are not removed, the oil quality deteriorate and the hydraulic device may have operational troubles. Therefore, various oil filter devices are conventionally used to remove such foreign matters. However, when such an oil filter device is positioned in an oil return pipe between a hydraulic driving device and the oil tank, back pressure is increased, so that the hydraulic device cannot be operated smoothly. Thus, according to the conventional techniques, the foreign matters in the oil are removed by positioning such oil filter device in an oil supply pipe between the hydraulic pump on the oil tank and the hydraulic driving device such as the oil pressure cylinder or the like.

Although the foreign matters in the oil supply pipe can be removed, the foreign matters which are produced in the upstream side of the hydraulic driving device i.e. the oil return pipe as well as in the oil tank itself are deposited gradually on the bottom of the oil tank. Accordingly, unless the foreign matters on the bottom of the tank are removed, it is impossible to clean the oil completely and prevent it from being deteriorated.

SUMMARY OF THE INVENTION

It is therefore an object of this invention to provide means capable of eliminating the deterioration of oil and the malfunction of the hydraulic device by removing effectively the foreign matters (such as the dusts, iron rust, drain water or the like) which are deposited on the bottom of the oil tank.

That is to say, the foreign matters deposited on the bottom of the oil tank can be separated only by positioning the oil filter device having an oil filter element adjacent the oil tank, i.e. without providing any special driving device such as e.g. a small-sized pump.

It is another object of this invention to provide means for effectively separating the foreign matters deposited on the bottom of the oil pump.

More specifically, the oil filter device for an oil tank of a hydraulic device comprises a filter element disposed between an inflow passage and an outflow passage; an oil inflow pipe for connecting a drain opening of the oil tank and the inflow passage of the oil filter means to each other; an oil return pipe for connecting an oil suction pipe of a hydraulic pump of an oil circulation system in the hydraulic means and the outflow passage of the oil filter means to each other; and a flow rate throttle means disposed in the oil return pipe.

Other objects, features and advantages of this invention will be readily apparent from the following description of a preferred embodiment thereof, taken in conjunction with the accompanying drawings, although variations and modifications may be effected without departing from the spirit and scope of the novel concepts of the disclosure.

BRIEF DESCRIPTION OR THE ACCOMPANYING DRAWINGS

FIG. 1 is an overall system view of a preferred embodiment according to this invention.

FIG. 2 is an enlarged section view of a flow rate throttle means according to this invention.

DETAILED DESCRIPTION OF THE PREFERRED EMBODIMENT

A preferred embodiment of this invention will now be described with reference to the accompanying drawings.

First of all, an overall construction of a hydraulic device according to this invention will be described.

Numeral 1 denotes an oil tank, upon an upper wall of which is disposed a hydraulic pump 3 to be driven by a motor 2.

The hydraulic pump 3 is, at its suction side, associated with an oil suction pipe 5 having a suction strainer 4, while at its discharge side, connected to an oil supply tube 6. The oil supply pipe 6 is, at its end, connected to a hydraulic cylinder 9 by way of a filter and a switching valve which are disposed in a preferred position of the hydraulic cylinder 9. Connected to the switching valve 8 an oil return pipe of which one end is communicates with the interior of the oil tank.

Disposed adjacent the oil tank 1 or coupled thereto is an oil filter device A. The oil filter device A comprises a body B and a container C. Formed within the body are an inflow passage D and an outflow passage E respectively. Disposed in the container C communicating the inflow passage D and the outflow passage E with each other is a filter element F. The filter element F is fixed with the body B by means of a bolt G and a nut H. Disposed on the bottom of the container C is a drain discharge valve I.

The filter element F may be of any known construction. For example, it may be of a porous form having laminated long and short fibers, or a plurality of papers. Thus, it effectively catches the dusts and iron rust, absorbs the water in the oil, and/or separates the water in the oil from the oil itself.

A drain opening J of the oil tank 1 communicates with the inflow passage D of the oil filter device A by an oil inflow pipe K, while the outflow passage E of the oil filter device A is communicated with a suction side of the oil pressure pump 3 i.e. the suction pipe 5 by an oil return pipe L.

Disposed in a preferred position of the oil return pipe L is a flow rate throttle M for limiting the oil flow rate in the return pipe L. According to this invention, the flow rate throttle M is an orifice as shown in FIG. 2, but it may be a needle valve or a diameter of a preferred position of the oil return pipe L may be sufficiently shorter than that of the oil inflow pipe K.

Under such circumstances, the foreign matters which have occurred in the oil pressure pump 3 or in the oil supply pipe 6, or some foreign matters sucked by the suction strainer 4 are removed by the oil filter 7. However, the foreign matters such as dusts, iron rust or water which have occurred in the switching valve 8, the hydraulic cylinder 9, the oil return pipe 10 and the like are ultimately deposited on the bottom of the oil tank 1.

According to the conventional oil filter device, the oil within the oil tank 1 is gradually deteriorated, thereby service life of the oil and thus the hydraulic device is shortened. In this embodiment, by driving the hydraulic pump 3, the oil is sucked by way of the oil return pipe 1, in addition to the oil suction by way of the strainer and the oil suction pipe 5. That is to say, a mixture of the oil and the foreign matters on the bottom of the oil tank flows into the container C from the outflow passage D by way of the oil inflow tube K, and reaches the oil filter element F. Then, the dusts, iron rust and water within the oil are separated and removed. Namely, the filter element F may catch the dusts and iron rust, and absorb the water. Alternatively, it may catch the dusts, iron rust or other solid foreign matters and separate the water which is removed from the drain discharge valve I. As discussed above, the oil suction of the hydraulic pump 3 is effected through the oil return pipe L, the oil, in which the foreign matters have been removed, is sucked into the hydraulic pump by way of the filter element F, the outflow passage E and the oil return pipe L.

Thus, the foreign matters which have deposited on the bottom of the oil tank 1 can be removed by the aforesaid process. Since the foreign matters can be separated by the actuation of the hydraulic pump 3, no other power is required. Further, quantity of the return oil is restricted, because the oil flow rate throttle M is disposed in the oil return pipe L. Namely, the degree of the restriction of the return oil can be regulated in accordance with the deposition degree of the foreign matters on the bottom of the oil tank 1. Accordingly, the separation of the foreign matters in the oil filter element F can be carried out efficiently.

A function of this invention will now be described.

As the hydraulic device is operated, the foreign matters such as the dusts, iron rust, drain or the like are gradually deposited on the bottom of the oil tank 1. Then, by driving the hydraulic device, the oil within the oil tank 1 is guided to the filter element F of the oil filter device A, passing through the drain opening J, the oil inflow pipe K and the inflow passage D. Then, the foreign matters are filtered by the filter element F, while the oil separated from the foreign matters is sucked into the oil suction pipe 5 communicated with the suction side of the hydraulic pump 3 by way of the outflow passage E and th oil return pipe L.

Accordingly, the oil which will remain on the bottom of the oil tank is purified. According to this invention, the oil return pipe L of the oil filter device A is associated with the oil suction pipe 5 communicated with the suction side of the hydraulic pump 3 in order to guide the foreign matters to the oil filter device A, and consequently no particular power is required.

Further, since the flow rate throttle M is disposed in the oil return pipe L, the quantity of the oil to be sucked into the pump 3 through the oil return pipe L can be recirculated swiftly. Therefore, the quantity of the oil to be introduced into the oil filter device A from the oil tank 1 is also restricted suitably. Thus, when regulating appropriately the flow rate throttle M in accordance with the deposition degree of the foreign matters on the bottom of the oil tank 1, the separating function of the filter element F can be enhanced significantly.

The effects of this invention will be summarized as follows.

① It is possible to remove effectively the foreign matters such as the dusts, iron rust, water or the like that may deposit and remain on the bottom of the oil tank. Accordingly, it is possible to prevent deteroration of the oil effectively.

② Any particular power such as a small-sized pump to remove the foreign matters is not required, because a suction pressure of the hydraulic pump in the hydraulic device is utilized.

③ The separating efficiency of the foreign matters by the filter element is superior.

④ Since the drain opening is disposed at one end of the bottom of the oil tank, it is easy to combine the drain opening with the oil filter device. Thus, the installation and construction cost is inexpensive.

What is claimed is:

1. A hydraulic system comprising:
an oil tank, said oil tank having four sides, a bottom, and a top so as to define a volume for containing oil;
inlet means for directing oil into said oil tank;
first outlet means for withdrawing oil from said oil tank, said first outlet means being positioned so as to withdraw oil from said bottom of said oil tank;
a first flow path originating at said first outlet means;
filter means for removing oil contaminants passing therethrough, said filter means being fluidly coupled to said first flow path so as to remove contaminants from oil passing through said first flow path;
second outlet means for withdrawing oil from said oil tank, said second outlet means being positioned within said volume;
a suction strainer mounted to said second outlet means;
a second flow path originating at said second outlet means;
said first and second flow paths being fluidly coupled to define a recombined flow path downstream of said filter means, there being simultaneous flow through said first outlet means and said second outlet means;
hydraulic pump means fluidly coupled to said recombined flow path for drawing oil therethrough and supplying pressurized oil;
a motor for driving said pump means;
secondary filter means fluidly coupled to said recombined flow path downstream of said pump means for filtering oil flowing through said recombined flow path;
return means for returning oil to said oil tank via said inlet means; and
flow rate throttle means defined within said first flow passage between said filter and said pump means for throttling the flow of oil to said pump means from said filter means and said first outlet means.

* * * * *